(12) United States Patent
Wang et al.

(10) Patent No.: US 11,889,935 B2
(45) Date of Patent: Feb. 6, 2024

(54) CROSS BEAM FOR CLOTHING SHAKING DEVICE, CLOTHING SHAKING DEVICE AND CLOTHING CARE EQUIPMENT

(71) Applicants: QINGDAO HAIER WASHING MACHINE CO., LTD., Shandong (CN); Haier Smart Home Co., Ltd., Shandong (CN)

(72) Inventors: Dongshan Wang, Qingdao (CN); Zongrui Chi, Qingdao (CN); Shengbo Chen, Qingdao (CN)

(73) Assignees: QINGDAO HAIER WASHING MACHINE CO., LTD., Qingdao (CN); Haier Smart Home Co., Ltd., Qingdao (CN)

( * ) Notice: Subject to any disclaimer, the term of this patent is extended or adjusted under 35 U.S.C. 154(b) by 192 days.

(21) Appl. No.: 17/439,041

(22) PCT Filed: Mar. 2, 2020

(86) PCT No.: PCT/CN2020/077467
§ 371 (c)(1),
(2) Date: Sep. 14, 2021

(87) PCT Pub. No.: WO2020/182008
PCT Pub. Date: Sep. 17, 2020

(65) Prior Publication Data
US 2022/0151415 A1 May 19, 2022

(30) Foreign Application Priority Data
Mar. 14, 2019 (CN) .......................... 201910195226.4

(51) Int. Cl.
*A47G 25/62* (2006.01)
(52) U.S. Cl.
CPC .................................. *A47G 25/62* (2013.01)

(58) Field of Classification Search
CPC ............ A47G 25/0692; A47G 25/1471; A47G 25/62; A47G 25/145; A47G 25/1457
See application file for complete search history.

(56) References Cited

U.S. PATENT DOCUMENTS 5,139,298 A *  8/1992  Dowell ................ A47G 25/145
                                                        294/165
9,549,630 B2 * 1/2017  Hansen .............. A47G 25/4015
(Continued)

FOREIGN PATENT DOCUMENTS

CN      201473779 U      5/2010
CN      105390869 A      3/2016
(Continued)

OTHER PUBLICATIONS

International Search Report dated May 28, 2020 in corresponding International application No. PCT/CN2020/077467; 6 pages.

*Primary Examiner* — Nathan E Durham
(74) *Attorney, Agent, or Firm* — Maier & Maier, PLLC

(57) ABSTRACT

A cross beam for a clothing shaking device, a clothing shaking device and a piece of clothing care equipment. The cross beam includes a body and an elastic clamping member arranged on the body, with the elastic clamping member being configured to be able to clamp a clothes hanger tightly in an elastic manner. The elastic clamping member is arranged on the cross beam, the clothes hanger is clamped and fixed by the elastic clamping member, that is to say, the elastic clamping member can clamp the clothes hanger tightly in an elastic manner by means of its own elasticity, such that the stability of the connection between the clothes hanger and the cross beam can be improved, and the clothes hanger is prevented from falling off of the cross beam when the clothing care equipment is in operation.

6 Claims, 6 Drawing Sheets

(56) References Cited

U.S. PATENT DOCUMENTS

| | | | | |
|---|---|---|---|---|
| 2005/0035076 A1* | 2/2005 | Schober | ............... | A47B 61/003 |
| | | | | 211/123 |
| 2005/0184108 A1* | 8/2005 | Ho | ....................... | A47G 25/183 |
| | | | | 223/85 |
| 2006/0037209 A1* | 2/2006 | Johnson | .................. | D06F 73/02 |
| | | | | 34/90 |

FOREIGN PATENT DOCUMENTS

| | | |
|---|---|---|
| CN | 205934500 U | 2/2017 |
| CN | 206141418 U | 5/2017 |
| CN | 207033324 U | 2/2018 |
| CN | 108708140 A | 10/2018 |
| CN | 208072036 U | 11/2018 |
| CN | 208440858 U | 1/2019 |
| CN | 208562900 U | 3/2019 |
| CN | 109930348 A | 6/2019 |
| CN | 210117528 U | 2/2020 |

* cited by examiner

A–A

CROSS BEAM FOR CLOTHING SHAKING DEVICE, CLOTHING SHAKING DEVICE AND CLOTHING CARE EQUIPMENT

FIELD

The present disclosure relates to the technical field of clothing care, and specifically provides a crossbeam for a clothing shaking device, a clothing shaking device and a clothing care apparatus.

BACKGROUND

With scientific and technical progress, the level of automation in people's lives is becoming higher and higher, and daily housework is gradually replaced by machines from manpower. As a common household appliance in daily life, a clothing care apparatus has brought great convenience to people's lives.

Cabinets of existing clothing care apparatuses are generally provided with a clothing shaking device to drive the clothing to shake, so as to achieve the effect of removing wrinkle. The clothing shaking device includes a crossbeam, on which a hanger is hung, and the crossbeam can reciprocate left and right when driven by a motor, thereby driving the clothing on the hanger to shake. However, since the crossbeam is typically made of high-hardness materials, a connection between the hanger and the crossbeam is not stable, and the hanger may easily fall off the crossbeam during the operation of the clothing care apparatus.

Accordingly, there is a need in the art for a new crossbeam for a clothing shaking device and a corresponding clothing shaking device and clothing care apparatus to solve the above problem.

SUMMARY

In order to solve the above problem in the prior art, that is, to solve the problem that the hanger may easily fall off the crossbeam of the clothing shaking device during the operation of the existing clothing care apparatus, the present disclosure provides a crossbeam for a clothing shaking device, in which the crossbeam includes a body and an elastic clamping member arranged on the body, and the elastic clamping member is configured to be capable of elastically clamping a hanger.

In a preferred technical solution of the above crossbeam, the crossbeam further includes a positioning member which is capable of positioning the elastic clamping member to the body.

In a preferred technical solution of the above crossbeam, the positioning member includes a positioning hook provided on the body and a positioning opening provided on the elastic clamping member, and the positioning hook is matched with the positioning opening.

In a preferred technical solution of the above crossbeam, the positioning member includes a positioning opening provided on the body and a positioning hook provided on the elastic clamping member, and the positioning hook is matched with the positioning opening.

In a preferred technical solution of the above crossbeam, the positioning hook is provided with a reinforcement rib.

In a preferred technical solution of the above crossbeam, the elastic clamping member is provided with a support structure on a side facing the body, and after the assembly is completed, the support structure elastically abuts against the body so that the positioning hook is hooked tightly on the positioning opening.

In a preferred technical solution of the above crossbeam, a part of the body that is in contact with the support structure is inclinedly arranged, and an included angle between the inclined direction and a horizontal plane is between 0 and 90 degrees.

In a preferred technical solution of the above crossbeam, the elastic clamping member is made of a plastic material.

In another aspect, the present disclosure also provides a clothing shaking device, which includes the crossbeam described above.

In further another aspect, the present disclosure also provides a clothing care apparatus, which includes the crossbeam described above.

It can be understood by those skilled in the art that in the preferred technical solutions of the present disclosure, by providing the elastic clamping member on the crossbeam, the hanger is clamped and fixed by the elastic clamping member, that is, the elastic clamping member can elastically clamp the hanger through its own elasticity, which can improve a connection stability between the hanger and the crossbeam, and prevent the hanger from falling off the crossbeam during the operation of the clothing care apparatus; besides, wear between the hanger and the crossbeam can be avoided, thereby improving a service life of the hanger and the crossbeam.

Further, the crossbeam further includes a positioning member, which can position the elastic clamping member to the body. By providing the positioning member, the connection stability between the elastic clamping member and the body can be improved on the basis of connecting the elastic clamping member and the body.

Furthermore, the positioning member includes a positioning hook provided on the body and a positioning opening provided on the elastic clamping member, and the positioning hook is matched with the positioning opening. That is, the positioning hook is matched with the positioning opening to position the elastic clamping member on the body. This arrangement facilitates the installation and detachment of the elastic clamping member, thereby improving an assembly efficiency of the crossbeam.

Still further, a reinforcement rib is provided on the positioning hook. Through such an arrangement, a strength of the positioning hook can be improved, so that the connection stability between the positioning hook and the positioning opening can be improved, and the connection stability between the elastic clamping member and the body can be improved.

Still further, the elastic clamping member is provided with a support structure on a side facing the body, and after the assembly is completed, the support structure elastically abuts against the body so that the positioning hook is hooked tightly on the positioning opening. Through this arrangement, the elastic clamping member can receive a support reaction force after the assembly is completed. Under the action of the support reaction force, the positioning hook can be hooked on the positioning opening, so that the elastic clamping member can be tightly fixed with the body to avoid swinging of the elastic clamping member relative to the body Still further, a part of the body that is in contact with the support structure is inclinedly arranged, and an included angle between the inclined direction and a horizontal plane is between 0 and 90 degrees. Through such an arrangement, the elastic clamping member can receive an inclinedly upward support reaction force after the assembly is completed. Under the action of the support reaction force, the positioning hook can be more tightly hooked on the positioning opening, so that the connection stability between the elastic clamping member and the body can be further improved.

In addition, the clothing shaking device provided by the present disclosure on the basis of the above technical solutions, due to the adoption the above crossbeam, further has the technical effects of the above crossbeam, and as compared with the clothing shaking device before improvement, the clothing shaking device of the present disclosure can prevent the hanger from falling off the crossbeam during operation, thereby ensuring the shaking effect of the clothing shaking device.

Moreover, the clothing care apparatus provided by the present disclosure on the basis of the above technical solutions, due to the adoption the above crossbeam, further has the technical effects of the above crossbeam, and as compared with the clothing care apparatus before improvement, the clothing care apparatus of the present disclosure can prevent the hanger from falling off the crossbeam during operation, thereby ensuring normal operation of the clothing care apparatus.

BRIEF DESCRIPTION OF DRAWINGS

Preferred embodiments of the present disclosure will be described below with reference to the accompanying drawings, in which.

DETAILED DESCRIPTION

Preferred embodiments of the present disclosure will be described below with reference to the accompanying drawings. It should be understood by those skilled in the art that these embodiments are only used to explain the technical principles of the present disclosure, and are not intended to limit the scope of protection of the present disclosure.

It should be noted that in the description of the present disclosure, terms indicating directional or positional relationships, such as "upper", "lower", "left", "right" and the like, are based on the directional or positional relationships shown in the accompanying drawings. They are only used for ease of description, and do not indicate or imply that the device or element must have a specific orientation, or be constructed or operated in a specific orientation, and therefore they should not be considered as limitations to the present disclosure.

In addition, it should also be noted that in the description of the present disclosure, unless otherwise clearly specified and defined, terms "arrange", "install", "connect" and "connection" should be understood in a broad sense; for example, the connection may be a fixed connection, or may also be a detachable connection, or an integral connection; it may be a mechanical connection, or an electrical connection; it may be a direct connection, or an indirect connection implemented through an intermediate medium, or it may be an internal communication between two elements. For those skilled in the art, the specific meaning of the above terms in the present disclosure can be understood according to specific situations.

Based on the problem pointed out in the "BACKGROUND OF THE INVENTION" that the hanger may easily fall off the crossbeam of the clothing shaking device during the operation of the existing clothing care apparatus, the present disclosure provides a new crossbeam for a clothing shaking device, a new clothing shaking device and a new clothing care apparatus, aiming at improving the connection stability between the hanger and the crossbeam, and preventing the hanger from falling off the crossbeam during the operation of the clothing care apparatus.

Figure 1:
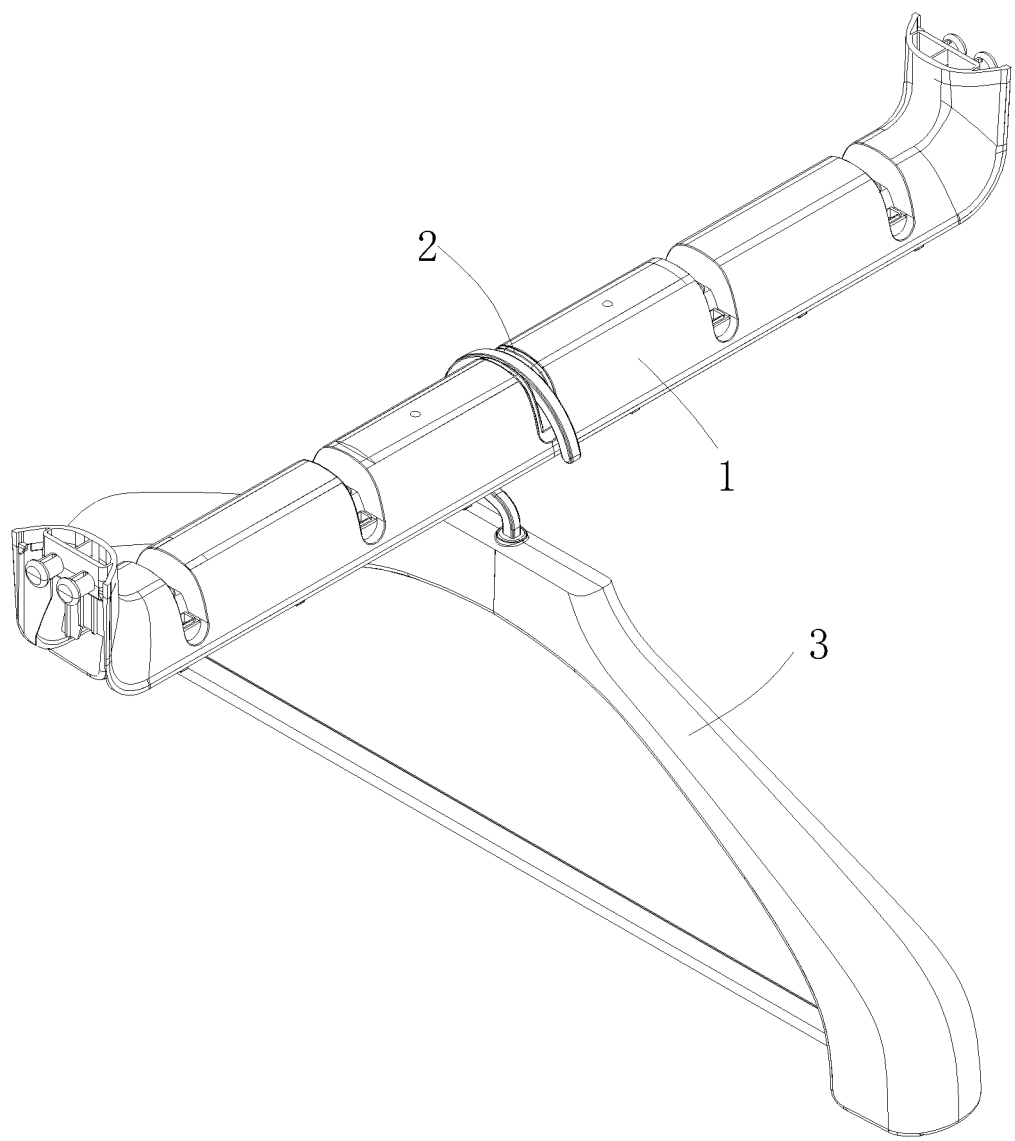
FIG. 1 is a schematic view showing installation of a crossbeam and a hanger of the present disclosure.
Figure 2:
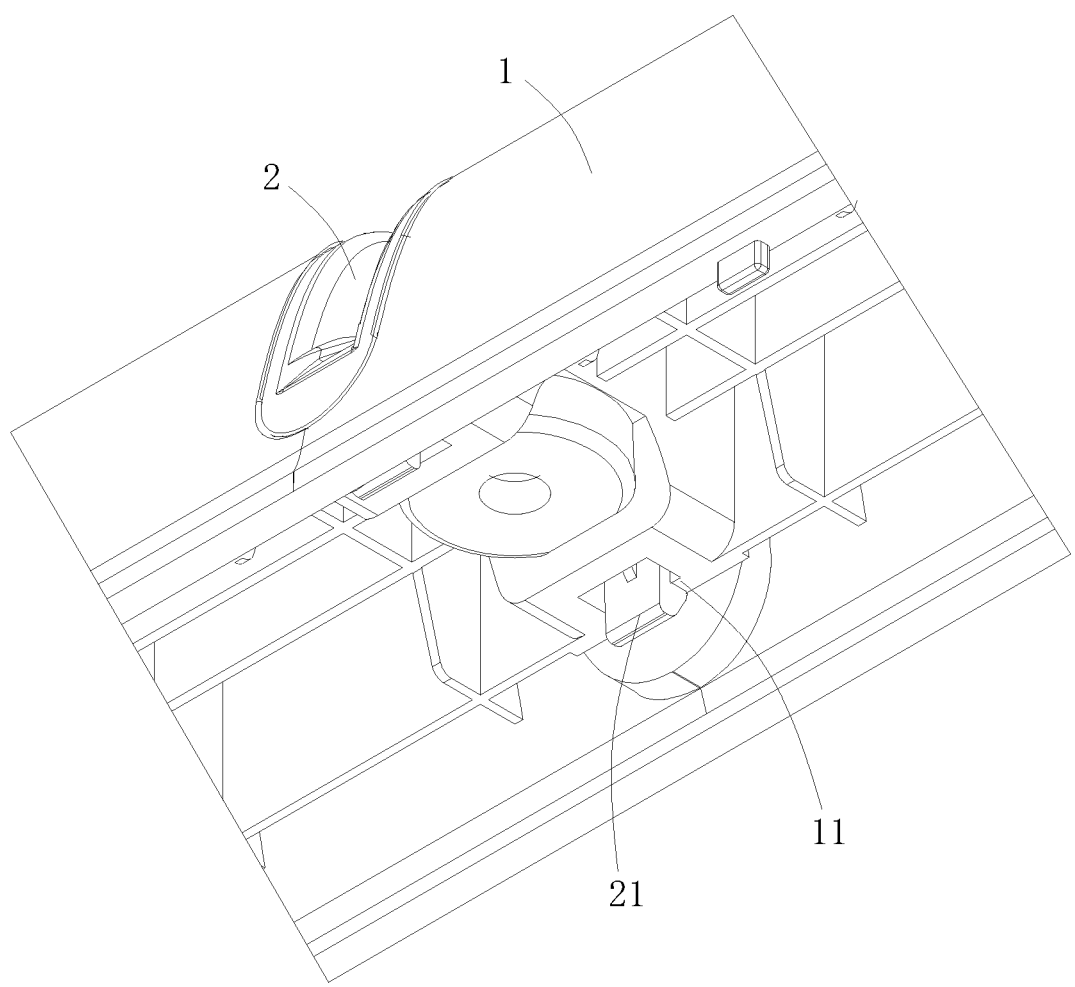
FIG. 2 is a partially enlarged view of the crossbeam of the present disclosure.

Specifically, as shown in FIG. 1, the crossbeam includes a body 1 and an elastic clamping member 2 provided on the body 1. The elastic clamping member 2 is configured to be capable of elastically clamping a hanger 3. As can be known from the background art, since the crossbeam is made of a high-hardness material, the connection between the hanger 3 and the crossbeam is unstable, which causes the hanger 3 to easily fall off the crossbeam during the operation of the clothing care apparatus. For this reason, the elastic clamping member 2 is provided on the crossbeam in the present disclosure, and the hanger 3 is clamped and fixed by the elastic clamping member 2, that is, the elastic clamping member 2 can elastically clamp the hanger 3 through its own elasticity, which can improve the connection stability between the hanger 3 and the crossbeam, and prevent the hanger 3 from falling off the crossbeam during the operation of the clothing care apparatus. The elastic clamping member 2 is made of a plastic material, which has a certain elasticity and can realize elastic clamping of the hanger 3. Of course, the elastic clamping member 2 may also be made of other elastic materials such as rubber. Such adjustments and changes to the specific manufacturing materials of the elastic clamping member 2 do not deviate from the principle and scope of the present disclosure, and should be defined within the scope of protection of the present disclosure.

Preferably, as shown in FIGS. 2 to 6, the crossbeam further includes a positioning member, which can position the elastic clamping member 2 to the body 1. The positioning member can be configured as a structure in which a positioning hook is matched with a positioning opening, or as a structure in which a snap-fit slot is matched with a snap-fit plate, or as a structure in which a positioning post is matched with a positioning hole, etc. Those skilled in the art may flexibly set the specific structure of the positioning member in practical applications, as long as the elastic clamping member 2 can be positioned to the body 1 by the positioning member.

In a possible embodiment, the positioning member includes a positioning hook provided on the body 1 and a positioning opening provided on the elastic clamping member 2, and the positioning hook is matched with the positioning opening. That is, the elastic clamping member 2 is positioned to the body 1 through the cooperation of the positioning hook and the positioning opening.

In another possible embodiment, as shown in FIGS. 2 to 6, the positioning member includes a positioning opening 11 provided on the body 1 and a positioning hook 21 provided on the elastic clamping member 2. The positioning hook 21 is matched with the positioning opening 11. That is, the positioning hook 21 cooperates with the positioning opening 11 to position the elastic clamping member 2 to the body 1. It should be noted that although the numbers of the positioning hook 21 and the positioning opening 11 in the figure are both two, this is not restrictive. The numbers of the positioning hook 21 and the positioning opening 11 may also be one, three or four, etc. Such adjustments and changes to the specific numbers of the positioning hook 21 and the positioning opening 11 do not deviate from the principle and scope of the present disclosure, and should be defined within the scope of protection of the present disclosure. In addition, it should be noted that the numbers of the positioning hook 21 and the positioning opening 11 do not necessarily have to be the same. For example, in the figure, two positioning hooks 21 may be simultaneously snap-fitted in an elongated positioning opening 11. Alternatively, three positioning hooks 21 arranged annularly may be simultaneously snap-fitted in a circular positioning opening 11, etc. Those skilled in the art may flexibly adjust the specific number of the positioning hook 21 and the specific number of the positioning opening 11 in practical applications, as long as the elastic clamping member 2 can be positioned to the body 1 through the cooperation of the positioning hook 21 and the positioning opening 11.

Figure 3:
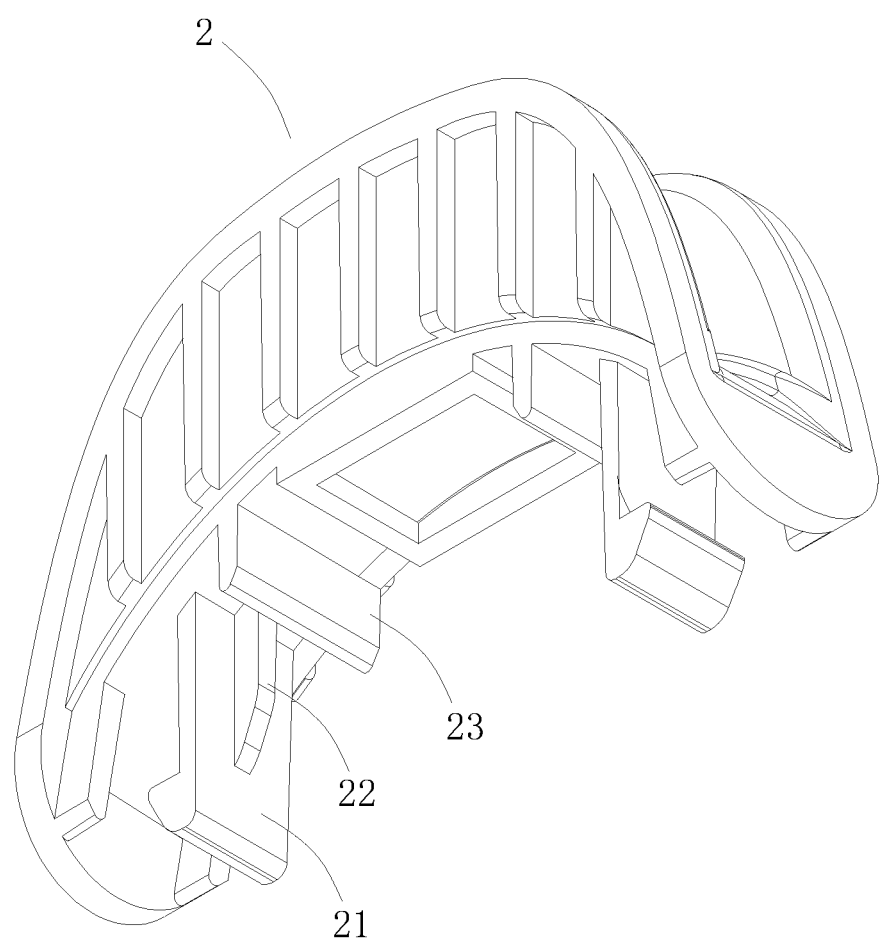
FIG. 3 is a schematic structural view of an elastic clamping member of the present disclosure.
Figure 4:
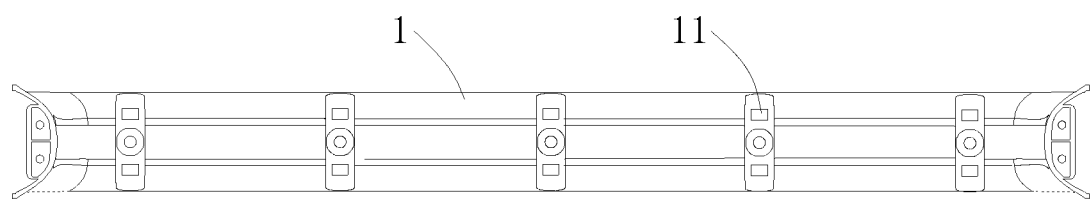
FIG. 4 is a schematic structural view of a body of the crossbeam of the present disclosure.
Figure 5:
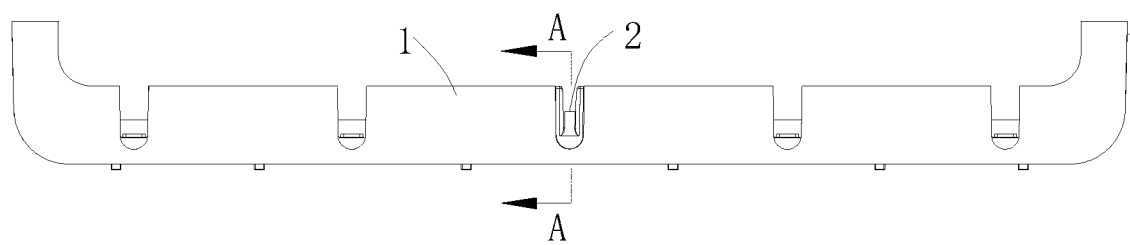
FIG. 5 is a schematic structural view of the crossbeam of the present disclosure.
Figure 6:
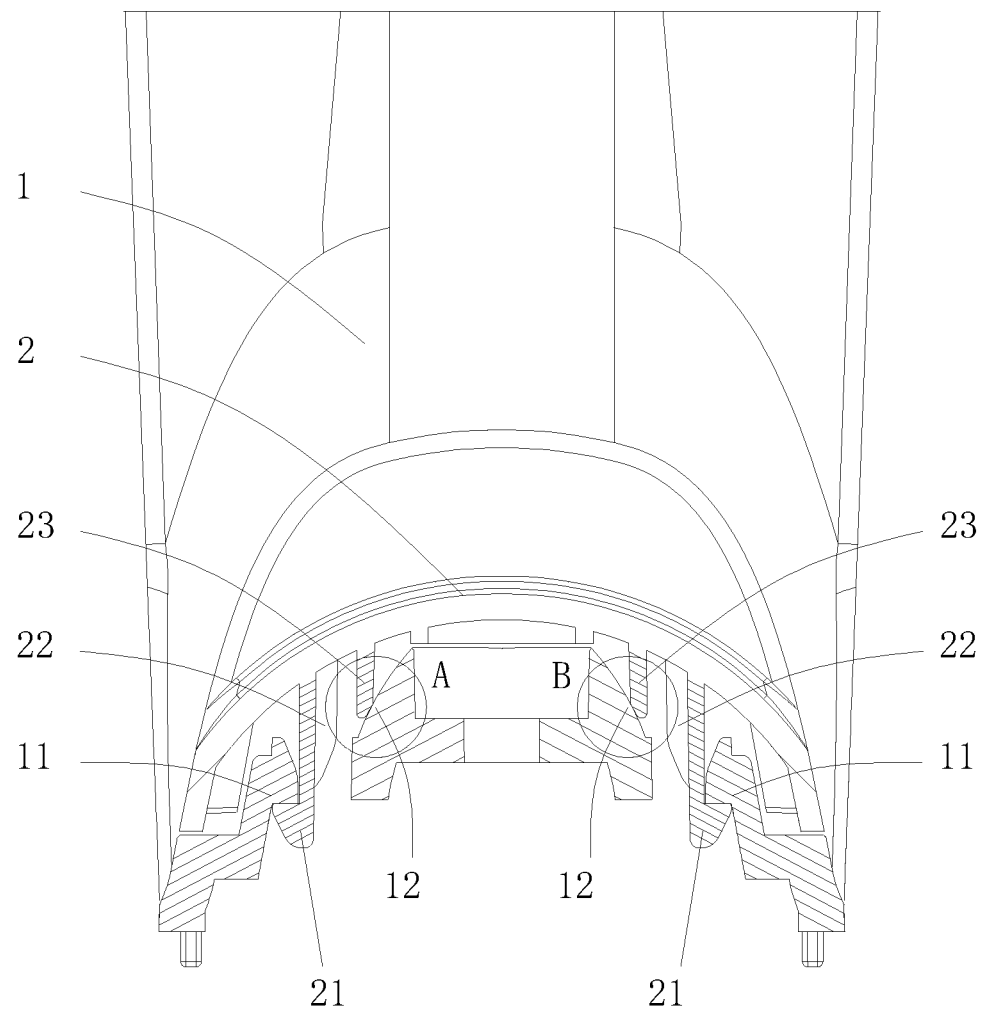
FIG. 6 is a sectional view of FIG. 5.
Figure 7:
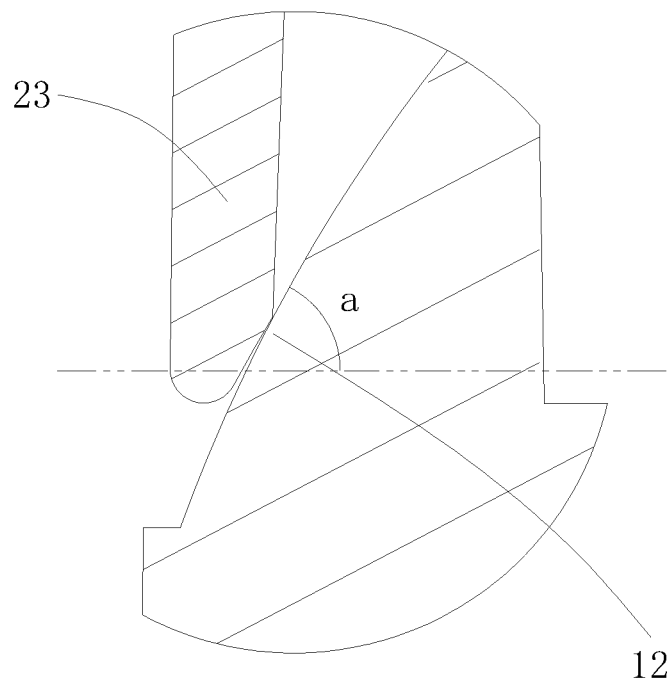
FIG. 7 is a partially enlarged view of part A in FIG. 6.
Figure 8:
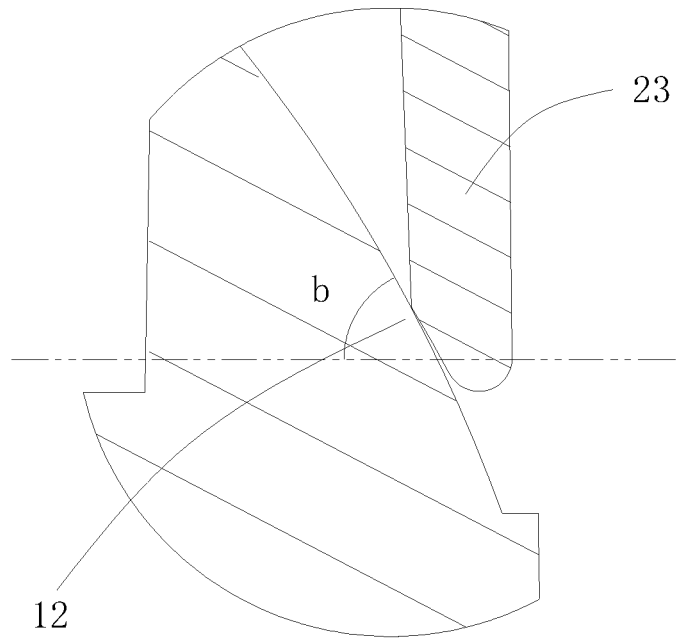
FIG. 8 is a partially enlarged view of part B in FIG. 6.

Preferably, as shown in FIG. 3, in order to improve the strength of the positioning hook 21, a reinforcement rib 22 is provided on the positioning hook 21. Through such an arrangement, the connection stability between the positioning hook 21 and the positioning opening 11 can be improved, so that the connection stability between the elastic clamping member 2 and the body 1 can be improved. It should be noted that although only one reinforcement rib 22 is provided on one side of the positioning hook 21 in the figure, this is not restrictive, and a reinforcement rib 22 may also be provided on the other side of the positioning hook 21, or two reinforcement ribs 22 are provided on one side of the positioning hook 21, and so on. Such adjustments and changes to the specific arrangement position and specific number of the reinforcement rib 22 do not deviate from the principle and scope of the present disclosure, and should be defined within the scope of protection of the present disclosure.

Preferably, as shown in FIGS. 3 to 6, the elastic clamping member 2 is provided with a support structure 23 on a side facing the body 1, and after the assembly is completed, the support structure 23 elastically abuts against the body 1 so that the positioning hook 21 is hooked tightly on the positioning opening 11. That is, after the assembly is completed, the support structure 23 is in a compressed state, so that the elastic clamping member 2 is subjected to a support reaction force, and under the action of the support reaction force, the positioning hook 21 can be hooked on the positioning opening 11. Through such an arrangement, the elastic clamping member 2 can be tightly fixed to the body 1 to avoid swinging of the elastic clamping member 2 relative to the body 1. The support structure 23 is a support plate formed on the elastic clamping member 2. After the assembly is completed, a bottom of the support plate elastically abuts against the body 1 so that the positioning hook 21 is hooked on the positioning opening 11. Of course, the support structure 23 may also be a support column or other structures formed on the elastic clamping member 2. Such adjustments and changes to the specific structure of the support structure 23 do not deviate from the principle and scope of the present disclosure, and should be defined within the scope of protection of the present disclosure.

In a possible embodiment, a part (i.e., a contact surface 12) of the body 1 that is in contact with the support structure 23 is a flat surface. After the assembly is completed, the support structure 23 is in a compressed state, so that the elastic clamping 2 is subjected to a vertical upward support reaction force, and under the action of the support reaction force, the positioning hook 21 can be hooked on the positioning opening 11.

In a preferred embodiment, as shown in FIG. 5 to FIG. 8, the part (the contact surface 12) of the body 1 that is in contact with the support structure 23 is inclinedly arranged, and an included angle between the inclined direction and a horizontal plane is between 0 and 90 degrees. First, taking the support structure 23 provided on the left side as an example, after the assembly is completed, the support structure 23 is in a compressed state, so that the elastic clamping member 2 is subjected to a leftward and upward diagonal support reaction force. Under the action of this support reaction force, the positioning hook 21 on the left side can be more tightly hooked on the positioning opening 11; second, taking the support structure 23 provided on the right side as an example, after the assembly is completed, the support structure 23 is in a compressed state, so that the elastic clamping member 2 is subjected to a rightward and upward diagonal support reaction force, and under the action of this support reaction force, the positioning hook 21 on the right side can be more tightly hooked on the positioning opening 11. Obviously, as compared with the above embodiment, the positioning hook 21 and the positioning opening 11 are more closely coupled in this preferred embodiment, so that the connection stability between the elastic clamping member 2 and the body 1 is better. It should be noted that by defining that the included angle between the inclined direction of the part (the contact surface 12) of the body 1 that is in contact with the support structure 23 and the horizontal plane is between 0 and 90 degrees, it means that for the support structure 23 provided on the left side, if the part (the contact surface 12) of the body 1 that is in contact with the support structure 23 is an inclined surface, then the included angle (the angle a shown in FIG. 7) between this inclined surface and the horizontal plane is between 0 and 90 degrees, and if the part (the contact surface 12) of the body 1 that is in contact with the support structure 23 is a circular arc surface, then the included angle (the angle a shown in FIG. 7) between a tangent direction of the circular arc surface of the body 1 that is in contact with the support structure 23 and the horizontal plane is between 0 and 90 degrees; and for the support structure 23 provided on the right side, if the part (the contact surface 12) of the body 1 that is in contact with the support structure 23 is an inclined surface, then the included angle (the angle b shown in FIG. 8) between this inclined surface and the horizontal plane is between 0 and 90 degrees, and if the part (the contact surface 12) of the body 1 that is in contact with the support structure 23 is a circular arc surface, then the included angle (the angle b shown in FIG. 8) between a tangent direction of the circular arc surface of the body 1 that is in contact with the support structure 23 and the horizontal plane is between 0 and 90 degrees.

Hitherto, the technical solutions of the present disclosure have been described in conjunction with the preferred embodiments shown in the accompanying drawings, but it is easily understood by those skilled in the art that the scope of protection of the present disclosure is obviously not limited to these specific embodiments. Without departing from the principles of the present disclosure, those skilled in the art can make equivalent changes or replacements to relevant technical features, and all the technical solutions after these changes or replacements will fall within the scope of protection of the present disclosure.

What is claimed is:

1. A crossbeam for a clothing shaking device comprising:
   a body;
   an elastic clamping member arranged on the body, wherein the elastic clamping member is configured to be capable of elastically clamping a hanger; and
   a positioning member which is capable of positioning the elastic clamping member to the body,
   wherein the positioning member comprises a positioning opening provided on the body and a positioning hook provided on the elastic clamping member, and the positioning hook is matched with the positioning opening; and
   wherein the elastic clamping member is provided with a support structure on a side facing the body, and after the assembly is completed, the support structure elastically abuts against the body so that the positioning hook is hooked tightly on the positioning opening.

2. The crossbeam according to claim 1, wherein the positioning hook is provided with a reinforcement rib.

3. The crossbeam according to claim 1, wherein a part of the body that is in contact with the support structure is inclinedly arranged, and an included angle between the inclined direction and a horizontal plane is between 0 and 90 degrees.

4. The crossbeam according to claim 1, wherein the elastic clamping member is made of a plastic material.

5. A clothing shaking device, comprising the crossbeam according to claim 1.

6. A clothing care apparatus, comprising the clothing shaking device according to claim 5.

* * * * *